April 24, 1962   E. A. BAUER ETAL   3,030,767
AIR FUEL RATIO CONTROL FOR A GASEOUS FUEL BURNING RAMJET
Filed Jan. 9, 1961

INVENTORS
ERNEST A. BAUER
RICHARD T. DUNGAN
BY
R. E. Geangue
ATTORNEY

United States Patent Office 3,030,767
Patented Apr. 24, 1962

3,030,767
AIR FUEL RATIO CONTROL FOR A GASEOUS FUEL BURNING RAMJET
Ernest A. Bauer, Burbank, and Richard T. Dungan, Palos Verdes, Calif., assignors to The Marquardt Corporation, Van Nuys, Calif., a corporation of California
Filed Jan. 9, 1961, Ser. No. 81,308
7 Claims. (Cl. 60—35.6)

This invention relates to a device for metering a gaseous fuel to a high speed, high temperature air breathing engine having variable inlet and outlet geometry or having variable air flow characteristics which are a function of speed or altitude.

Metering devices have been utilized for metering liquid fuel to an air-breathing engine in order to maintain a selected fuel-air ratio. One such device is disclosed in U.S. patent application entitled Air Mass Flow Computer, Serial No. 708,675, filed January 13, 1958, by B. T. Arnberg et al. and assigned to the same assignee. This device utilizes a probe in the form of a cold-flow ram jet engine model which is utilized to obtain a measure of actual air flow through the engine. In this prior device, it is necessary to obtain a separate signal of air mass flow for use in a fuel flow regulator. A metering device for gaseous fuel is disclosed in U.S. patent application Serial No. 40,358, filed July 1, 1960, by John A. Drake, and assigned to the same assignee. In this device, a probe in the form of a cold flow ram jet model is utilized to swallow an airflow which is substantially proportional to the airflow entering the main engine. The probe inlet is exposed to the same air conditions as the main engine inlet or to conditions which will satisfy the requirement of swallowing a definite proportion of the engine air mass flow. The capture air is discharged from the probe through a probe exit nozzle and a pressure at the probe nozzle is utilized as a measure of the air flow through the engine. Prior to discharge from the probe nozzle, the air captured by the probe travels through a heat exchanger which is designed to bring the air temperature to a value almost identical to the temperature of the fuel supplied to the engine. While this prior device functions adequately to swallow a definite portion of the mass air flow through a low speed engine which does not require a variable inlet and outlet, a more exact signal of air flow is required in high temperature engines flying at hypersonic speeds.

The present invention provides an improvement on prior gaseous fuel metering devices in that it provides a means for continually maintaining the proportionality between the total air flow and the probe air flow throughout the high speed flight range of the engine. More particularly, the present invention provides a pickup opening in the probe exit nozzle which can be positioned along the divergent portion of the nozzle in accordance with flight conditions so that the pressure measured by the pickup gives an air flow signal always proportional to main engine air flow regardless of the operating condition of the main engine. At high speeds, the ratio of the probe air flow to the engine air flow is a function of the ratio of the design frontal areas and of the ratio of captured air variations as a function of Mach number. Thus, the position of the pickup in the probe exit nozzle is controlled in a manner such that the variation in the ratio of the reference area to the throat area of the nozzle with Mach number equals the variable in the quotient of the capture area-to-cowl area ratios of the engine and the probe.

It is therefore an object of the present invention to provide a universal metering device for gaseous fuel in which a total pressure probe is utilized to capture air and provide a signal of mass air flow in the main engine; said signal being produced by a pressure pickup in the probe exit nozzle whose position is variable with Mach number.

Another object of the invention is to provide a universal metering device for gaseous fuels in which a signal of mass air flow through the main engine is obtained from a total pressure probe, the pressure pickup within the probe exit nozzle being variable in position in accordance with flight Mach number so that the signal remains proportional to main engine air flow at high speed where variable air flow inlet characteristics result as a function of speed or altitude.

A further object of the invention is to provide a universal metering device for gaseous fuels which gives direct control of the fuel air ratio to the main engine without the necessity of separate measurements of fuel flow and air flow; said device having means for sensing a probe pressure which is modified as a function of Mach number.

These and other objects of the invention not specifically set forth above will become readily apparent from the accompanying description and drawings, in which.

Figure 1:
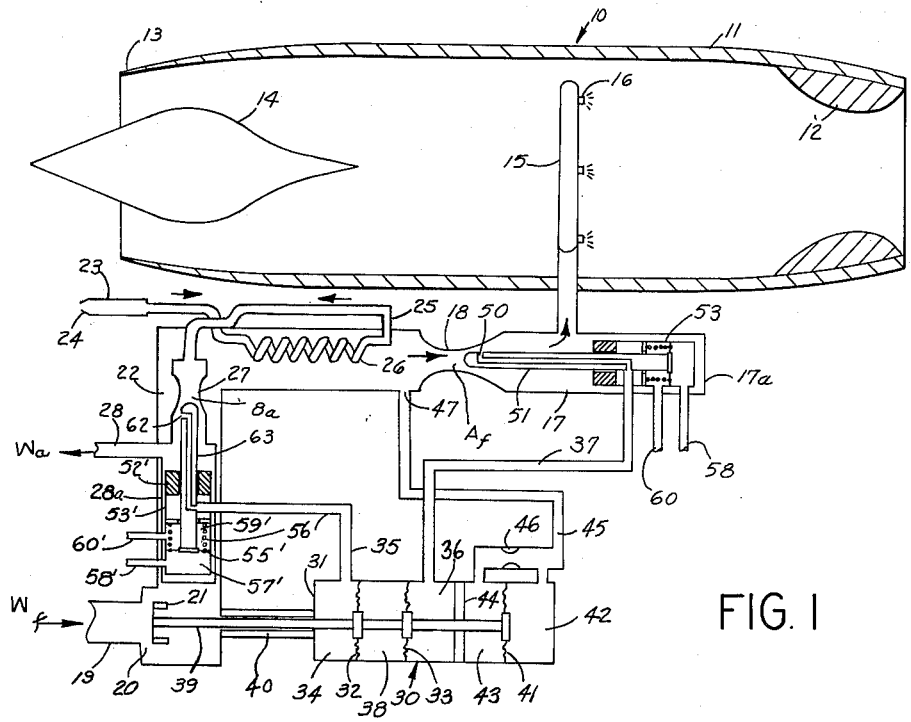
FIGURE 1 is a diagrammatic illustration of the universal metering device of the present invention showing movable pressure pickups positioned within the probe exit nozzle and the fuel nozzle.

Referring to the embodiment of the invention illustrated in FIGURE 1, a ram jet engine 10 comprises a casing 11 having an exit nozzle 12, which can be variable in area, and an inlet 13 containing a diffuser body 14 which can be movable for varying the inlet area. A fuel manifold 15 is located between the inlet and exit nozzle and is connected with a plurality of fuel jets 16 for distribution of the gaseous fuel within the engine. The manifold 15 is supplied with fuel from fuel passage 17 which contains fuel nozzle 18. Fuel is introduced to passage 17 from supply passage 19 through a valve opening 20 controlled by a valve 21. The fuel passes through the valve opening 20 into space 22 within passage 17 and then through the nozzle 18 into the manifold 15. The fuel supply pressure in the passage 19 is great enough at all times to insure that the nozzle 18 will be choked over the full operating range of fuel flow, i.e., the nozzle will have sonic flow of the gaseous fuel at its throat under all operating conditions.

A probe 23 in the form of a total pressure probe is located in the supersonic air stream and has a normal shock type inlet 24 which is designed to swallow an air flow approximately proportional to the air flow entering the main engine 10. The inlet 24 of the probe 23 is connected by passage 25 to heat exchanger coil 26 located in space 22 within passage 17. The discharge end of coil 26 is connected to a probe exit nozzle 27 which exhausts through passage 28. Due to the cooling by the flowing fuel outside coil 26, the temperature of the air inside coil 26 will be brought to a value almost identical to the temperature of the fuel leaving coil 26.

The valve 21 is controlled by a regulator 30 which comprises a casing 31 containing a pair of spaced diaphragms 32 and 33. Space 34 on one side of diaphragm 32 receives the air pressure in passage 35, and space 36 at one side of diaphragm 33 receives the fuel pressure in passage 37. The chamber 38 intermediate the diaphragms 32 and 33 is filled with an inert gas, such as helium at one atmosphere, so that the gases in spaces 34 and 36 cannot contact one another and explode. Both diaphragms are connected to the stem 39 for the valve 21 and the stem is supported by a bearing 40 located between the casing 31 and the passage 17. A third diaphragm 41 is located in casing 31 and defines a space 42 at one side and space 43 at the other side which is separated from space 36 by a partition 44. The stem 39 passes through partition 44 and is connected to the diaphragm 41. Space 42 connects directly with a passage 45 while the space 43 connects to passage 45 through a restriction 46. The passage 45 connects with opening 47 in nozzle 18 to receive the static pressure $P_{f_s}$ upstream of the nozzle 18. Upon a change in fuel flow in passage 17, the space 42 will sense the pressure $P_{f_s}$ directly while the chamber 43 will sense a lagged pressure $P_{f_s}$ because of the restriction 46 and these pressures are used to provide a proportional-plus-integral control of valve 21 in order to stably maintain the selected value of fuel-air ratio.

Figure 2:
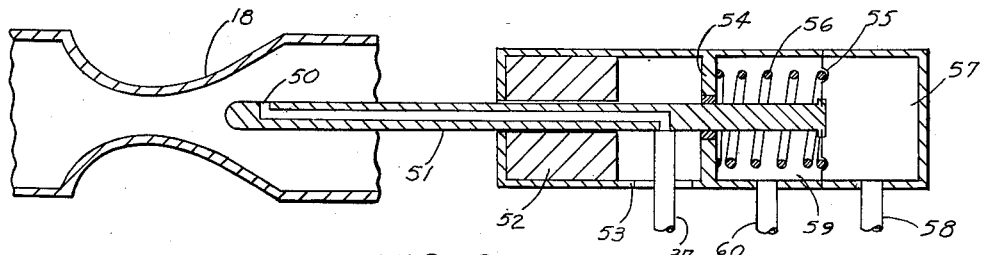
FIGURE 2 is an enlarged section of one of the probes.

The passage 37 connects with static pressure pickup opening 50 in pressure probe 51 which is movably supported in the divergent section of nozzle 18 by bearing portion 52 in the casing 53 (see FIGURE 2). The end of the probe opposite the static opening 50 passes through a partition 54 and connects with diaphragm 55 which can be loaded in one direction by spring 56. A space 57 on one side of the diaphragm 55 is connected to a first control pressure through passage 58, and the space 59 on the other side of the diaphragm is connected to another control pressure through a passage 60. Thus, by varying the ratio of pressures in passages 58 and 60, the static opening 50 can be located at any desired position along the nozzle 18 in order to obtain a static pressure which is proportional to mass fuel flow through passage 17. It is therefore apparent that by positioning the static opening 50 along the divergent section of nozzle 18, a selected value of fuel-air ratio can be obtained by varying the pressure $P_{f_x}$ which is measured in passage 37 connected to regulator 30. The passage 17 has an enlarged space 17a to receive the casing 53 without disrupting fuel flow through the passage.

The passage 35 connects with static pressure pickup opening 62 located in pressure probe 63 which is movably supported in the divergent portion of the nozzle 27 by a bearing portion 52' in a casing 53'. Also, the probe is connected with a diaphragm 55' within the casing 53' and the passages 58' and 60' connect with spaces 57' and 59', respectively, on opposite sides of the diaphragm. The diaphragm is spring biased by a spring 56' and the probe structure is the same as shown for probe 51 in FIGURE 2. The passages 60' and 58' receive, respectively, free stream total pressure and ambient static pressure so that the position of the static opening 62 in the divergent position of nozzle 27 will be a function of flight Mach number, since the ratio of these pressures is a measure of Mach number. It is understood that suitable pressure pickups (not shown) can be utilized to obtain these pressures. Thus, by properly contouring nozzle 27, the opening 62 can be made to always obtain a pressure signal proportional to mass air flow through the main engine at all flight speeds, since the variation of design capture area of probe and engine is a function of Mach number. The static pressures at openings 50 and 62 act on diaphragms 32 and 33 to maintain fuel flow which is a given portion of the mass air flow so that the design air fuel ratio can be maintained. Passage 28 has an enlarged portion 28a to accommodate the casing 53'. In the steady state condition of the regulator 30, the pressure $P_{f_x}$ in chamber 36 equals the pressure $P_{a_x}$ in chamber 34 and the pressure $P_{f_s}$ in chamber 42 equals the lagged pressure $P_{f_s}$ in chamebr 43. It is understood that the helium in chamber 38 has no net effect on the pressure balance of the regulator 30. Thus, the regulator maintains the ratio of $P_{f_x}/P_{a_x}$ equal to the constant K, the selected value of which determines the fuel-air ratio of the main engine.

It can be shown that the ratio $P_{f_x}/P_{a_x}$ is proportional to the fuel-air ratio $W_f/W_a$. The equation for mass flow through the nozzle 18 is as follows:

$$W_f = \frac{P_{t_f} A_{f_n} \overset{o}{m}_f}{\sqrt{T_{t_f}}}$$

where $W_f$ is the mass fuel flow through the nozzle 18, $P_{t_f}$ is the total fuel pressure at the fuel nozzle entrance, $A_{f_n}$ is the effective area of the fuel nozzle throat, $$\overset{o}{m}_f$$

is the mass flow function which is a function of Mach number, and $T_{t_f}$ is the total temperature at the fuel nozzle entrance. In a similar manner, the air mass flow through the orifice 27 can be represented as $$W_a = \frac{P_{t_a} A_{a_n} \overset{o}{m}_a}{\sqrt{T_{t_a}}}$$

where $W_a$ is the air mass flow through the probe, $A_{a_n}$ is the effective area of the probe exit nozzle throat, $$\overset{o}{m}_a$$

is the mass flow function which is a function of Mach number, $P_{t_a}$ is the total air pressure at the probe nozzle, and $T_{t_a}$ is the total temperature at the probe nozzle. By dividing the above two equations to obtain the ratio of $W_f/W_a$, the square roots of total temperature cancel out since the total temperature of the air entering nozzle 27 is made equal to the total temperature of the fuel entering nozzle 18 by utilization of the heat exchanger 26. Therefore, $$W_f/W_a = \frac{P_{t_f}}{P_{t_a}} \frac{A_{f_n}}{A_{a_n}} \frac{\overset{o}{m}_f}{\overset{o}{m}_a}$$

Pressures $P_{f_x}$ and $P_{a_x}$ are static pressures measured at openings 50 and 62, respectively, and the above mass flow equation can also be written incorporating these static pressures as follows:

$$W_f/W_a = \frac{P_{f_x}}{P_{a_x}} \frac{A_{f_x}}{A_{a_x}} \frac{\overset{o}{m}_f}{\overset{o}{m}_a}$$

where $A_{f_x}$ is the area in the divergent portion of nozzle 18 at the point where opening 50 is located and $A_{a_x}$ is the area at the divergent portion of nozzle 27 at the point where opening 62 is located. In this last relationship, the pressures $P_{f_x}$ and $P_{a_x}$ are lower than $P_{t_f}$ and $P_{t_a}$ but the areas $A_{f_x}$ and $A_{a_x}$ are greater than the throat areas $A_{f_n}$ and $A_{a_n}$. If the air flow through the probe nozzle is representative of the air flow through the engine, then $$W_a = KW_e$$

where $W_e$ is the air flow through the engine and $$\frac{W_f}{W_e} = K \frac{\overset{o}{m}_f P_{f_x} A_{f_x}}{\overset{o}{m}_a P_{a_x} A_{a_x}}$$

The control problem for an accurate control of fuel air ratio is the determination of the characteristic variations of K throughout the flight range. In other words, the probe air flow must be a known portion of the total engine air intake. It can be shown that $$W_a = \frac{A_{cp}}{A_c} f(M_o) W_e$$

where $A_{cp}$ is the design capture area of the probe and $A_c$ is the design capture area of the engine cowl. Thus, the term $$\frac{A_{cp}}{A_c} f(M_o)$$

is the "K" proportionality factor between engine air flow and probe air flow. Therefore $$\frac{W_f}{W_e} = \frac{A_{cp}}{A_c} f(Mo) \frac{\overset{o}{m}_f P_{f_x} A_{f_x}}{\overset{o}{m}_a P_{a_x} A_{a_x}}$$

Thus, the ratio of probe air flow to engine air flow is a function of the ratio of the design frontal area and the ratio of capture area variation as a function of Mach number. The pickup opening 62 can therefore measure air flow proportional to mass engine air flow if the measured pressure is corrected for change in probe and engine capture area with Mach number.

Figure 3:
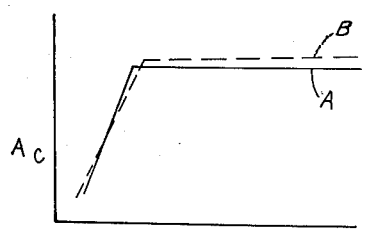
FIGURE 3 is a graphic illustration of the variation of the capture area with Mach number for both the probe and the main engine.

Referring to FIGURE 3, the curves A and B represent typical variation of capture area of the main engine and probe, respectively, with Mach number. It is pointed out that the difference in capture area increases as Mach number increases and that the shape of curves A and B will vary with inlet design of the main engine and probe. Thus, the opening 62 will be moved with Mach number such that the revised pressure will compensate for variation in design capture area. By moving the probe opening toward the throat of nozzle 27 upon increase in Mach number, the sensed static pressure will decrease and will be a fraction of the throat static pressure determined by the ratio of the nozzle areas at the pickup opening and at the throat. In other words, the motion of the probe 63 is controlled in a manner such that the variation in the ratio of nozzle area at the opening to throat area with Mach number equals the variation in the quotient of the capture area-to-cowl area ratios of the main engine and the probe. The position of static opening 50 in nozzle 18 determines the value of K since the opening senses a varying static pressure determined by the ratio of nozzle area at the opening to nozzle throat area. Therefore, the fuel air ratio maintained by the regulator 30 can be changed by the control pressures in passages 58 and 60.

In operation, when trajectory or atmospheric variations, or altered conditions of fuel flow change the fuel to air ratio demands of the engine, the pressure balance in the regulator 30 changes. The unbalance of the regulator will shift the position of the fuel valve 21 to decrease or increase fuel flow and this change in fuel flow will be sensed by opening 50. A new balance for regulator 30 is obtained when the pressures in the regulator again become equal and the amount of fuel flow satisfies the altered demands of the fuel air ratio control. It is understood that while the regulator 30 drives the fuel valve directly, it could be used separately with a slave piston driving the fuel valve. Also, any suitable biasing force (in addition to control pressure) can be used to position the opening 50 and the biasing pressures can be a function of one or more engine variables, so that the fuel-air ratio is changed in accordance with the magnitude of the variables. The present invention provides a fuel metering device which is operable at high Mach numbers where compensation of probe pressure is necessary to obtain a suitable signal of engine mass flow. The probe and pickup of the present invention are an improvement over the probe of prior application Serial No. 40,358 which operates under conditions of flight speed, etc. where compensation of the sensed pressure is not required for satisfactory fuel control. Obviously, the opening 50 could be fixed in location either along the nozzle 18 or ahead of the nozzle if variation in fuel air ratio is not required. Various other modifications are contemplated by those skilled in the art without departing from the spirit and scope of the invention as hereinafter defined by the appended claims.

What is claimed is:

1. A device for metering gaseous fuel to a main air-breathing engine comprising a cold-flow ramjet probe having an inlet located in the freestream of the main engine and an exit nozzle connected with said inlet, a fuel passage connected with the main engine and containing a fuel nozzle, means for placing the probe air and gaseous fuel in heat exchange relationship so that the probe air upstream of the probe nozzle reaches the same temperature as the gaseous fuel upstream of the fuel nozzle, a fuel valve in said fuel passage, a first pressure pickup located at said fuel nozzle to obtain a first pressure proportional to fuel flow to the main engine, a second pressure pickup movable in the divergent section of said probe nozzle to obtain a second pressure, means responsive to flight Mach number and connected with said second pressure pickup for positioning said second pickup along said divergent section to vary said second pressure in accordance with flight Mach number and make said second pressure proportional to mass air flow to the main engine, and regulator means responsive to said first and second pressures and connected with said fuel valve to maintain a selected ratio between said pressures and thereby maintain a selected fuel air ratio in said engine.

2. A metering device as defined in claim 1 wherein said positioning means comprises diaphragm means connected with said second pressure pickup, and means for imparting pressures to opposite side of said diaphragm means to position said second pickup in accordance with flight Mach number.

3. A device for metering gaseous fuel to a main air-breathing engine capable of flight at hypersonic speeds comprising a cold-flow ramjet probe having an inlet positioned in the same freestream as the main engine, a probe exit nozzle connected with said probe inlet, heat exchanger means connected with said probe inlet and said probe nozzle for controlling the temperature of captured air entering said probe nozzle, a gaseous fuel passage connected with said main engine and containing a fuel nozzle, a control valve in said fuel passage upstream of said fuel nozzle, said heat exchanger means being located in said fuel passage intermediate said control valve and said fuel nozzle so that the temperature of the air in said probe upstream of said probe nozzle becomes equal to the temperature of the fuel in said passage, a first pressure pickup located in said fuel nozzle to obtain a first pressure proportional to fuel flow to the main engine, a second pressure pickup movable in the divergent section of said probe nozzle to obtain a second pressure, means responsive to flight Mach number and connected with said second pressure pickup for positioning said second pickup along said divergent section to vary said second pressure in accordance with flight Mach number and make said second pressure proportional to mass air flow to the main engine, and regulator means responsive to said first and second pressures and connected with said control valve to maintain a selected ratio between said pressures and thereby maintain a selected fuel air ratio in said engine.

4. A metering device as defined in claim 3 wherein said second pressure pickup means comprises an elongated probe containing a static pressure opening at one end and passage means connecting said static opening with said regulator means, said positioning means comprising a diaphragm connecting with the other end of said probe, and means for applying pressures to opposite sides of said diaphragm for positioning said probe as a function of flight Mach number.

5. A metering device as defined in claim 4 wherein said pressure applying means comprises a first passage connecting with one side of said diaphragm and containing freestream total pressure, and a second passage connected with the opposite side of said diaphragm and containing ambient static pressure, the ratio of said freestream total and ambient static pressures being a measure of flight Mach number.

6. A metering device as defined in claim 3 wherein said first pressure pickup comprising a probe having a static pressure opening at one end and continually located in the divergent section of said fuel nozzle, passage means in said probe for connecting said static pressure opening to said regulator means, and means for positioning said probe in said divergent section to sense a static pressure representing a selected portion of actual engine fuel flow depending upon position of said static opening.

7. A metering device as defined in claim 6 wherein said positioning means comprises a diaphragm connected with the other end of said probe, and passage means for connecting opposite sides of said diaphragm to control pressures to selectively position said static opening to provide a fuel-air ratio selected by said control pressures.

References Cited in the file of this patent

UNITED STATES PATENTS

| | | |
|---|---|---|
| 2,792,685 | Constantino | May 21, 1957 |
| 2,934,898 | Graefe | May 3, 1960 |